US012647292B2

(12) United States Patent
Wang et al.

(10) Patent No.: US 12,647,292 B2
(45) Date of Patent: Jun. 2, 2026

(54) BLOCKCHAIN-BASED INDUSTRIAL INTERNET OF THINGS DATA MANAGEMENT AND OPTIMIZATION SYSTEM AND METHOD

(71) Applicant: QINGDAO UNIVERSITY OF TECHNOLOGY, Qingdao (CN)

(72) Inventors: Jinlong Wang, Qingdao (CN); Yixin Li, Qingdao (CN); Yunting Wu, Qingdao (CN); Xiaoyun Xiong, Qingdao (CN); Yuanyuan Zhang, Qingdao (CN)

(73) Assignee: QINGDAO UNIVERSITY OF TECHNOLOGY, Qingdao (CN)

( * ) Notice: Subject to any disclaimer, the term of this patent is extended or adjusted under 35 U.S.C. 154(b) by 65 days.

(21) Appl. No.: 18/912,417

(22) Filed: Oct. 10, 2024

(65) Prior Publication Data

US 2025/0047515 A1 Feb. 6, 2025

(30) Foreign Application Priority Data

Apr. 29, 2024 (CN) .......................... 202410529291.7

(51) Int. Cl.
H04L 9/00 (2022.01)
G06F 17/16 (2006.01)
(Continued)

(52) U.S. Cl.
CPC ................ H04L 9/50 (2022.05); G06F 17/16 (2013.01); G16Y 40/10 (2020.01); G16Y 40/50 (2020.01)

(58) Field of Classification Search
CPC ......... H04L 9/50; H04L 9/3239; G06F 17/16; G06F 16/211; G06F 16/2365;
(Continued)

(56) References Cited

U.S. PATENT DOCUMENTS

2018/0330348 A1 11/2018 Uhr et al.
2022/0405750 A1 12/2022 Fallah et al.
(Continued)

FOREIGN PATENT DOCUMENTS

CN 117914701 A * 4/2024 ........... H04L 41/145
KR 20250057979 A * 4/2025 .......... H02J 7/00712

OTHER PUBLICATIONS

Rawlins, Charles, and Jagannathan Sarangapani. "Predicting IoT Distributed Ledger Fraud Transactions With a Lightweight GAN Network." IEEE Transactions on Mobile Computing 23.7 (2023): 7818-7829. (Year: 2023).*

*Primary Examiner* — Michael R Vaughan

(57) ABSTRACT

The present invention discloses a blockchain-based Industrial Internet of Things (IIoT) data management system and method, where the system includes a physical layer, an edge layer, a network interface layer and a cloud layer; the physical layer includes a plurality of different IIoT device monitoring systems; the edge layer is configured to build an IIoT blockchain network; the cloud layer includes cloud servers which are configured to be deployed in a real blockchain network environment to improve performance and effectiveness of the blockchain network. The present invention can effectively solve the problem of parameter optimization lag in industrial production applications.

10 Claims, 5 Drawing Sheets

(51) Int. Cl.
    *G16Y 40/10*        (2020.01)
    *G16Y 40/50*        (2020.01)

(58) Field of Classification Search
    CPC ...... G06F 16/252; G16Y 40/10; G16Y 40/50;
                  G16Y 10/25; G06N 3/0455; G06N
            3/0464; G06N 3/048; G06N 3/0499;
                                     G06N 3/092
    See application file for complete search history.

(56)                      References Cited

U.S. PATENT DOCUMENTS

| | | | |
|---|---|---|---|
| 2024/0160939 A1* | 5/2024 | Mopur | G06N 3/045 |
| 2024/0214462 A1 | 6/2024 | Choi | |
| 2024/0273462 A1* | 8/2024 | Mohammed | G06Q 10/087 |
| 2025/0071175 A1* | 2/2025 | Yu | H04L 67/12 |
| 2025/0167550 A1* | 5/2025 | Chen | H04L 9/50 |
| 2025/0173404 A1* | 5/2025 | Tran | H04L 9/088 |

\* cited by examiner

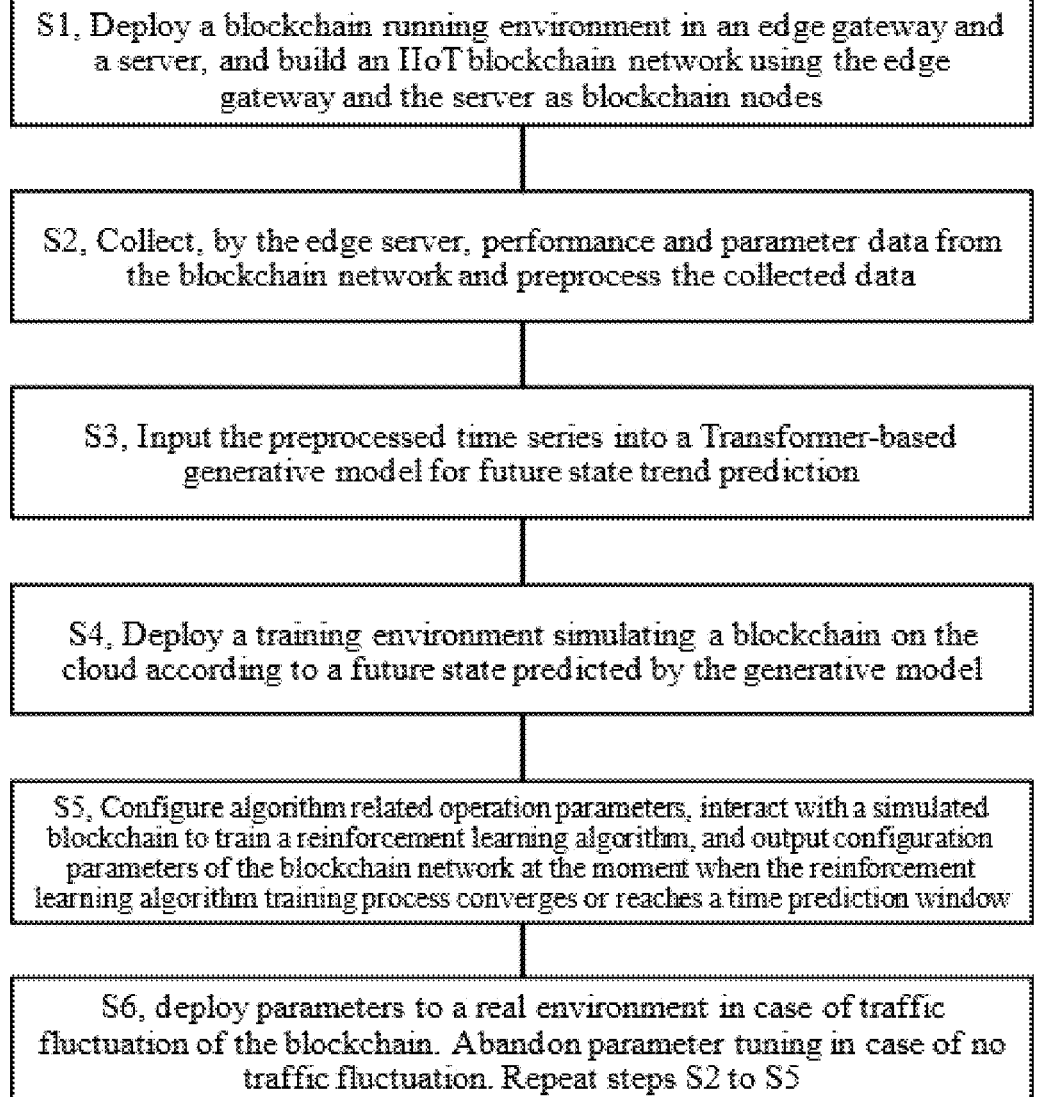

S1, Deploy a blockchain running environment in an edge gateway and a server, and build an IIoT blockchain network using the edge gateway and the server as blockchain nodes S2, Collect, by the edge server, performance and parameter data from the blockchain network and preprocess the collected data S3, Input the preprocessed time series into a Transformer-based generative model for future state trend prediction S4, Deploy a training environment simulating a blockchain on the cloud according to a future state predicted by the generative model S5, Configure algorithm related operation parameters, interact with a simulated blockchain to train a reinforcement learning algorithm, and output configuration parameters of the blockchain network at the moment when the reinforcement learning algorithm training process converges or reaches a time prediction window S6, deploy parameters to a real environment in case of traffic fluctuation of the blockchain. Abandon parameter tuning in case of no traffic fluctuation. Repeat steps S2 to S5

FIG. 4

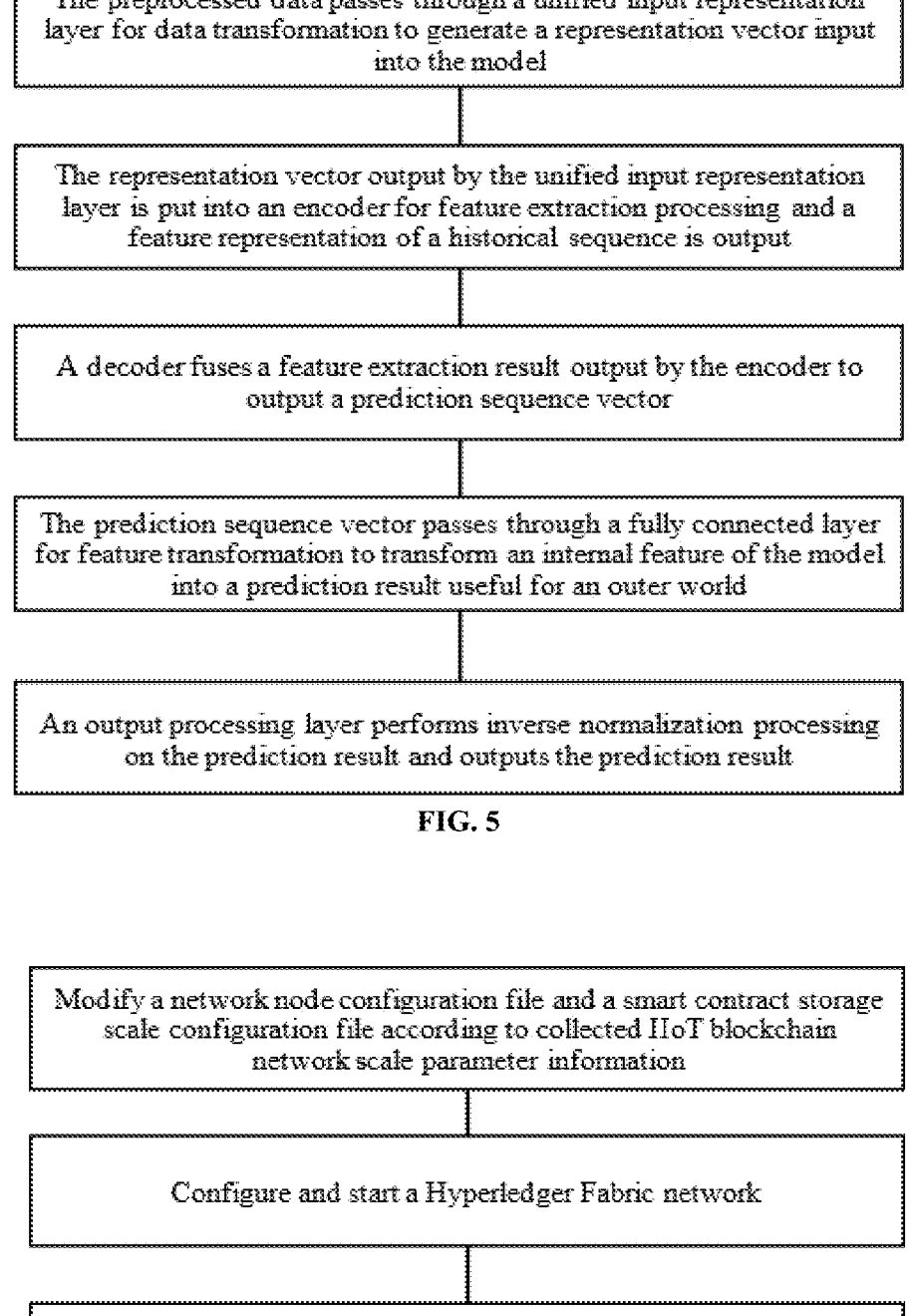

The preprocessed data passes through a unified input representation layer for data transformation to generate a representation vector input into the model The representation vector output by the unified input representation layer is put into an encoder for feature extraction processing and a feature representation of a historical sequence is output A decoder fuses a feature extraction result output by the encoder to output a prediction sequence vector The prediction sequence vector passes through a fully connected layer for feature transformation to transform an internal feature of the model into a prediction result useful for an outer world An output processing layer performs inverse normalization processing on the prediction result and outputs the prediction result

FIG. 5

Modify a network node configuration file and a smart contract storage scale configuration file according to collected IIoT blockchain network scale parameter information Configure and start a Hyperledger Fabric network Use Prometheus to collect blockchain node state information According to the prediction result of the generative model, configure a transmission rate parameters in the stress test tool Caliper, start test, and obtain performance test parameters of the blockchain network

FIG. 6

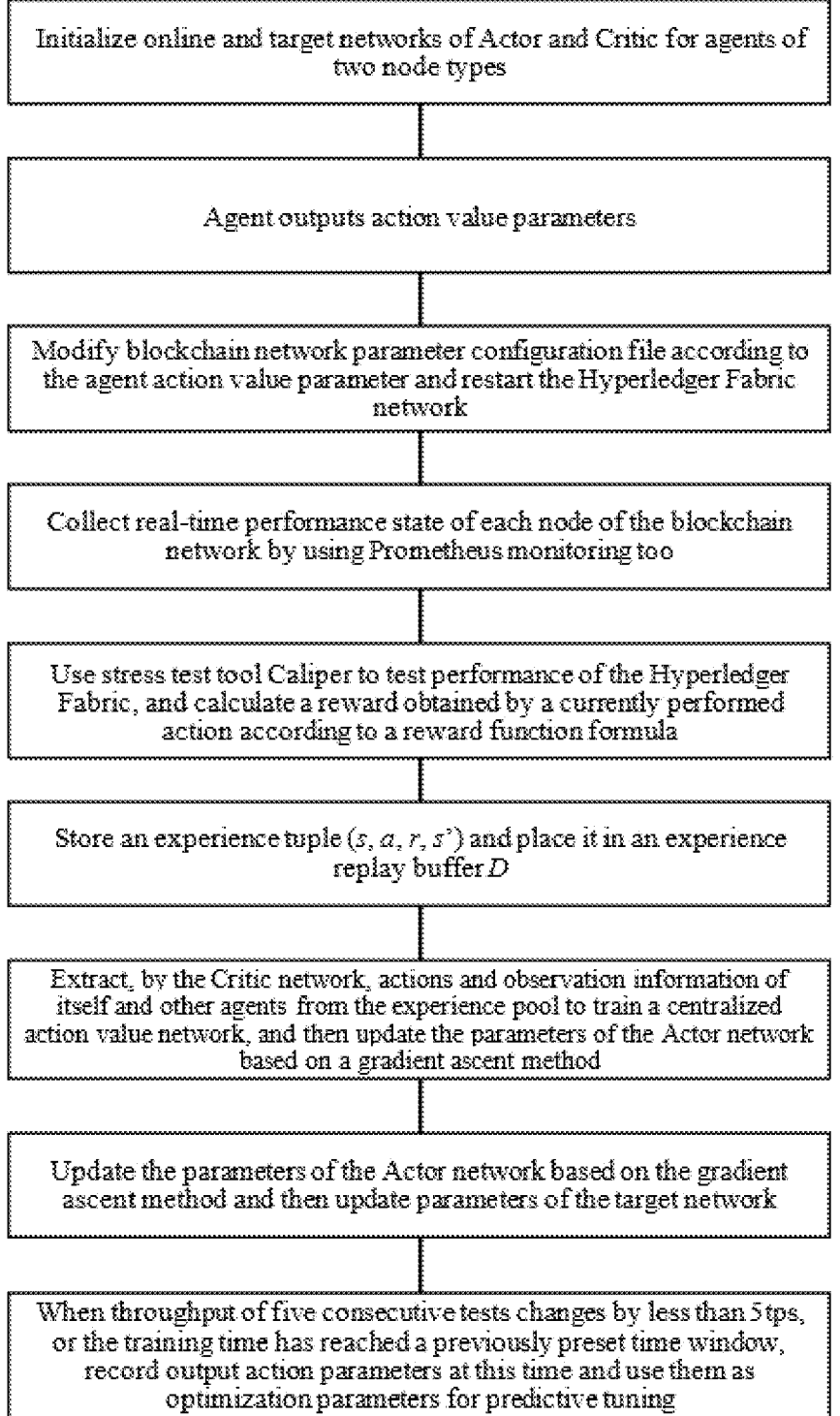

Initialize online and target networks of Actor and Critic for agents of two node types Agent outputs action value parameters Modify blockchain network parameter configuration file according to the agent action value parameter and restart the Hyperledger Fabric network Collect real-time performance state of each node of the blockchain network by using Prometheus monitoring too Use stress test tool Caliper to test performance of the Hyperledger Fabric, and calculate a reward obtained by a currently performed action according to a reward function formula Store an experience tuple ($s$, $a$, $r$, $s'$) and place it in an experience replay buffer $D$ Extract, by the Critic network, actions and observation information of itself and other agents from the experience pool to train a centralized action value network, and then update the parameters of the Actor network based on a gradient ascent method Update the parameters of the Actor network based on the gradient ascent method and then update parameters of the target network When throughput of five consecutive tests changes by less than 5 tps, or the training time has reached a previously preset time window, record output action parameters at this time and use them as optimization parameters for predictive tuning

FIG. 7

BLOCKCHAIN-BASED INDUSTRIAL INTERNET OF THINGS DATA MANAGEMENT AND OPTIMIZATION SYSTEM AND METHOD

TECHNICAL FIELD

The present invention pertains to the field of blockchain technology and Industrial Internet of Things (IIoT), and particularly pertains to a blockchain-based IIoT data management and optimization system and method.

BACKGROUND

Combining the blockchain technology with industrial data management can ensure reliability of data during monitoring. This means that in an entire fault monitoring process, from data acquisition, transmission to analysis, each link can be reliably recorded and verified, thus significantly improving transparency and reliability of the data. However, with the introduction of 6G technology in the future, the real-time performance and dynamicity of the network will be further improved. At the same time, the inherent performance bottlenecks of the blockchain technology also lead to data processing latency, making performance optimization a key challenge.

In current solutions, although reinforcement learning algorithms are applied to blockchain performance optimization, parameter tuning lags due to long training time and delayed feedback cycles. In addition, existing solutions lack effective policy for multi-level industrial data processing because industrial monitoring data come from equipment of different importance, and a large number of normal monitoring data will hinder the timely processing of abnormal data.

SUMMARY

In order to solve the above-mentioned technical problems, the present invention provides a blockchain-based Industrial Internet of Things (IIoT) data management and optimization system and method which uses a generative model based on a Transformer architecture to predict a future transaction transmission rate and dynamically tunes blockchain network parameters according thereto, which can effectively solve the problem of parameter optimization lag in industrial production applications.

In order to achieve the above object, the present invention uses the following technical solution:

A blockchain-based Industrial Internet of Things (IIoT) data management and optimization system, includes a physical layer, an edge layer, a network interface layer and a cloud layer;

the physical layer includes a plurality of different IIoT device monitoring systems;

the edge layer includes an edge server and an edge gateway, the edge server and the edge gateway serve as nodes of a blockchain and are configured to build a an IIoT blockchain network; the IIoT blockchain network processes data storage transaction requests of different IIoT device monitoring systems; the edge gateway is responsible for information transmission and data processing tasks between the physical layer and the edge server; the edge server is responsible for collecting performance and parameter data from the IIoT blockchain network, and preprocessing the collected data to ensure accuracy and consistency of the data; and the edge server is also deployed with a Transformer-based generative model which is configured to predict a blockchain transaction volume in a future period of time according to the preprocessed data to obtain a prediction result, and the prediction result will be configured to simulate an environment configuration for the blockchain;

the network interface layer includes a blockchain service interface and a 6G network communication interface, which are responsible for communication connection and blockchain service between the edge layer and the cloud layer, and the blockchain service interface is deployed with a smart contract interface; and the cloud layer includes cloud servers which, in a cloud server cluster, receive the prediction result from the edge server, deploy an environment simulating the blockchain based on the prediction result, and configure a stress test tool for interactive training of an reinforcement learning algorithm, and during the interactive training, the reinforcement learning algorithm selects optimal configuration parameters based on a state of the blockchain network for deployment in a real IIoT blockchain network environment to improve performance and effectiveness of the blockchain network.

In the solution described above, the Transformer-based generative model includes a unified input representation layer, an encoder, a decoder, a fully connected layer and an output processing layer; the unified input representation layer is configured to transform the data to generate a representation vector input into the model; the encoder includes two multi-head ProbeSparse self-attention layers, each multi-head ProbeSparse self-attention layer is immediately followed by a feedforward neural network, and the encoder is configured to perform feature extraction processing and output a feature representation of a historical sequence; the decoder includes a masked multi-head ProbeSparse self-attention layer, a multi-head attention layer and a concatenation layer, and the decoder is configured to fuse a feature extraction result output by the encoder and output a prediction sequence vector; the fully connected layer is configured for feature transformation to transform an internal feature of the model into a prediction result useful for an outer world; and the output processing layer is configured to perform inverse normalization processing on a prediction sequence and output the prediction sequence.

A blockchain-based IIoT data management and optimization method, uses the blockchain-based IIoT data management and optimization system described above, includes the following steps:

S1, deploying a blockchain running environment in an edge gateway and an edge server, and building an IIoT blockchain network using the edge gateway and the edge server as blockchain nodes;

S2, collecting, by the edge server, performance and parameter data of the IIoT blockchain network and preprocessing the collected data;

S3, inputting the preprocessed data into a Transformer-based generative model to predict a blockchain transaction volume in a future period of time;

S4, deploying a training environment simulating a blockchain in a cloud server according to the predicted blockchain transaction volume in the future period of time;

S5, configuring algorithm related operation parameters, interacting with the environment simulating the blockchain configured in the cloud server to train a reinforcement learning algorithm, and outputting configuration parameters of the blockchain network at the moment when the reinforcement learning algorithm training process converges or reaches a time prediction window; and S6, in a real IIoT blockchain network environment, deploying parameters optimized in the environment simulating the blockchain to the real environment in case of traffic fluctuation of the blockchain; or abandoning parameter tuning in case of no traffic fluctuation, and repeating steps S2 to S5 to continue a next stage of predictive optimization.

In the solution described above, a specific method of step S3 is as follows:

Step 1: the preprocessed data passes through a unified input representation layer for data transformation to generate a representation vector input into the model;

Step 2: the representation vector output by the unified input representation layer is put into an encoder for feature extraction processing and a feature representation of a historical sequence is output;

Step 3: a decoder fuses a feature extraction result output by the encoder to output a prediction sequence vector;

Step 4: the prediction sequence vector passes through a fully connected layer for feature transformation to transform an internal feature of the model into a prediction result useful for an outer world; and Step 5: an output processing layer performs inverse normalization processing on the prediction result and outputs the prediction result.

In a new technical solution, a specific processing process of Step 1 is as follows:

the unified input representation layer realizes data transformation by combining a global time embedding SE and a local time embedding PE, thus generating a representation vector $$x^t_{feed}$$

input into the model:

$$x^t_{feed[m]} = \alpha x^t_m + PE_{(N*(t-1)+m)} + \sum_p [SE_{(N*(t-1)+m)}]_p$$

where $\alpha$ is a scalar factor configured to balance importance between feature mapping and time embedding, N is a number of samples, $m \in [1, N]$ represents a sample index, and p and t respectively represent a global time type and a number of input sequences; and the global time embedding is represented by a learnable embedding $SE_{pos}$, while the local time embedding is a fixed position embedding in Transformer which is calculated using the following formula:

$$PE_{(pos,2n)} = \sin\left(\frac{pos}{(2N)^{2n/d_{model}}}\right)$$

$$PE_{(pos,2n+1)} = \cos\left(\frac{pos}{(2N)^{2n/d_{model}}}\right)$$

where $n \in [1, \ldots, d_{model}/2]$, pos represents positional information, and $d_{model}$ is a characteristic dimension of the input representation.

In a new technical solution, a specific processing process of Step 2 is as follows:

firstly, the encoder receives $$x^t_{feed}$$

from the unified input representation layer and inputs the same into a multi-head ProbeSparse self-attention layer I, and a calculation formula thereof is:

$$\text{ProbeSparse\_Att}(Q, K, V) = \text{Softmax}\left(\frac{\bar{Q}K^T}{\sqrt{d_{model}}}\right)V$$

where $\bar{Q}$ is a sparse matrix of the same size as Q, and only contains first u most relevant queries under a sparsity metric $M(q_i, K)$; and $Q \in R^{N \times d_{model}}$, $K \in R^{N \times d_{model}}$ and $V \in R^{N \times d_{model}}$ respectively represent a query vector, a key vector and a value vector; these vectors are obtained by performing linear transformation on the input feature, that is, $$[Q, K, V] = [X^t_{feed} \cdot W_Q, X^t_{feed} \cdot W_K, X^t_{feed} \cdot W_V],$$

where $W_Q \in R^{N \times d_{model}}$, $W_K \in R^{N \times d_{model}}$ and $W_V \in R^{N \times d_{model}}$ are trainable parameter matrices respectively corresponding to Q, K and V; and $d_{model}$ is a characteristic dimension of the input representation;

where a formula of the sparsity metric $M(q_i, K)$ is as follows:

$$M(q_i, K) = \ln\sum_{j=1}^{L_K} e^{\frac{q_i k_j}{\sqrt{d}}} - \frac{1}{L_K}\sum_{j=1}^{L_K} \frac{q_i k_j}{\sqrt{d}}$$

where $q_i$ represents an ith query vector, K represents a key matrix, $k_j$ represents a jth key vector in K, $L_K$ represents a length of the key K which is a number of keys, and d is a characteristic dimension of the input;

after processing by the multi-head ProbeSparse self-attention layer I, a feedforward neural network layer I is used for further operation processing; operation steps of the feedforward neural network are as follows: firstly, a convolutional neural network is used to extract advanced features of the data, and then, a length of the sequence is reduced by max pooling operation, and a specific process is represented as:

$$X^t_{q+1} = MaxPool\left(ELU\left(Conv1d\left[X^t_q\right]_{AB}\right)\right)$$

where Conv1d represents one-dimensional convolutional operation, ELU is an activation function, and MaxPool is a max pooling function, $$[X^t_q]_{AB}$$

5 is an output of the multi-head Probesparse self-attention layer I, and $$X_{q+1}^t$$

is an output of the multi-head ProbeSparse self-attention layer I; next, after further feature processing by a multi-head Probesparse self-attention layer II and a feedforward neural network layer II with the same structure as above, the features are concatenated and used as an output $$X_{Encoder}^t$$

of the encoder, and a formula thereof is expressed as follows:

$$X_{Encoder}^t = Concat \left( FFN2 \left( Probesparse\_Att2 \left( X_{q+1}^t \right) \right) \right)$$

In a new technical solution, a specific processing process of Step 3 is as follows:
firstly, a start marker $$X_{token}^t$$

of the sequence and a placeholder $X^t{}_0$ of the prediction sequence are input, and these two pieces of data are combined into an input vector of the decoder through a concatenation operation; the start marker indicates the start of the prediction sequence, and the placeholder $X^t{}_0$ reserves a position for a future prediction value, and a formula thereof is as follows:

$$X_{de}^t = FeatureConcat(X_{token}^t, X_0^t) \in R^{(N_{token}+N_y) \times d_{model}}$$

where $N_{token}$ is a length of the start marker, and $N_y$ is a length of a placeholder of a prediction sequence y; $d_{model}$ is the characteristic dimension of the input representation of the model;

$$X_{de}^t$$

represents an input of the decoder at time t, $$X_{token}^t$$

represents a start marker of a sequence at time t, and $$X_0^t$$

represents a placeholder of a prediction sequence at time t; the input data

6

$$X_{de}^t$$

first passes through the masked multi-head ProbeSparse self-attention layer to ensure that the model can only access the information before a current time step when generating prediction for each time step, where a formula of the masked multi-head ProbeSparse self-attention layer is expressed as follows:

$$Mask\_ProbeSparse\_Att(Q, K, V, M) = Softmax\left( \frac{\overline{Q}K^T}{\sqrt{d_{model}}} \| M \right) V$$

where $\|$ represents an element multiplication, M is a masked matrix with a shape the same as $\overline{Q}K^T$ and the rest of the letters having the same meanings as those of the multi-head ProbeSparse self-attention layer; and the output of the masked multi-head ProbeSparse attention layer is $X_{mask}$;

then $X_{mask}$ is put into the multi-head self-attention layer for enhancement processing, and an output result is Attention($X_{mask}$), and a formula of the multi-head self-attention layer is expressed as follows:

$$Attention(Q, K, V) = Softmax\left( \frac{QK^T}{\sqrt{d_{model}}} \right) V$$

where $Q \in R^{N \times d_{model}}$, $K \in R^{N \times d_{model}}$ and $V \in R^{N \times d_{model}}$ respectively represent a query vector, a key vector and a value vector; these vectors are obtained by performing linear transformation on the input feature; that is, $$[Q, K, V] = [X_{mask}^t \cdot W_Q, X_{mask}^t \cdot W_K, X_{mask}^t \cdot W_V];$$

where $W_Q \in R^{N \times d_{model}}$, $W_K \in R^{N \times d_{model}}$ and $W_V \in R^{N \times d_{model}}$ are trainable parameter matrices respectively corresponding to Q, K and V;
then the data Attention($X_{mask}$) output by the multi-head self-attention layer and an output $$X_{Encoder}^t$$

of the encoder are subject to feature concatenation by a concatenation layer to further integrate context information from the encoder, and an output is $X_{Con}$ which is represented as follows:

$$X_{Con} = Concat(Attention(X_{mask}), X_{Encoder}^t).$$

In a new technical solution, in Step 4, the concatenated data $X_{Con}$ is subject to feature transformation by the fully connected layer, and the layer outputs a prediction sequence for a future sequence $X_{t+K}$, where K represents a length of the predicted future sequence, a formula thereof is expressed as follows:

$$X_{t+K} = Fc(X_{Con});$$

in Step 5, the prediction sequence $X_{t+K}$ is subject to inverse normalization processing by the output processing layer, and a formula of the inverse normalization processing is:

$$X'_{t+K} = X_{t+K} \cdot (\max(X) - \min(X)) + \min(X)$$

where $$X^t_{t+K}$$

represents a prediction of the blockchain transaction volume in the future period of time based on historical and current states, and the prediction result will be configured to simulate an environment configuration for a blockchain, and K represents the length of the predicted future sequence.

In a new technical solution, in step S4, the operation of deploying the environment simulating the blockchain includes the following steps:

Step 1: environment configuration file modification: modifying a network node configuration file and a smart contract storage scale configuration file according to a number of blockchain network nodes and node organization information and channel configuration condition collected in step S2;

Step 2: configuring and starting a Hyperledger Fabric network, defining an organization and nodes, then generating a network configuration file and an encryption material, and then starting network services comprising ordering services, node consensus services and chain code installation deployment;

Step 3: using Prometheus to monitor state of the blockchain nodes, and acquiring state information of each current blockchain node; and Step 4: starting a stress test tool Caliper and obtaining performance test results of an initial blockchain network.

In a new technical solution, in step S5, the reinforcement learning algorithm training parameter tuning process includes the following steps:

Step 1: initializing online and target networks of Actor and Critic for agents of two node types, and then initializing a random exploration action process $N_p$, monitoring the deployed Hyperledger Fabric network, receiving the collected initial state s and performing standardization processing;

Step 2: performing actions according to an agent policy: in each iteration, each agent selects an action $\alpha_i$ according to the policy $\pi(\alpha_i)$ and exploration noise N;

Step 3: deploying new blockchain network parameters and restarting the Hyperledger Fabric network according to the agent action;

Step 4: using the stress test tool Caliper to test performance of the Hyperledger Fabric to calculate a reward obtained by a currently performed action; and after the reward value is obtained by calculating, taking an average value to allocate to each agent;

Step 5: monitoring the Prometheus and collecting a new blockchain network state s';

Step 6: storing an experience tuple: storing the current state s, the executed action $\alpha$, the reward r and a new state s' as a tuple (s, $\alpha$, r, s'), and placing the tuple in an experience replay buffer D;

Step 7: extracting, by the Critic network, actions and observation information of itself and other agents from the experience replay buffer D to train a centralized action value network $Q_P$.

Step 8: updating a parameter of the Actor network based on a gradient ascent method, and then softly updating parameters of their target networks, that is, after every certain number of iteration steps, the parameters of the online network are directly assigned to the target network; and Step 9: in the training phase, when throughput of five consecutive feedbacks changes by less than 5 tps, or the training time has reached a previously preset time window, output action parameters at this time are recorded and used as optimization parameters for predictive tuning.

With the technical solutions described above, the system and method for managing and optimizing IIoT data based on blockchains provided by the present invention have the following beneficial effects:

The present invention proposes an IIoT data management framework combined with blockchain, which, for the performance bottleneck problem of blockchain, uses an enhanced learning model to perform parameter tuning, and dynamically tunes configuration parameters of a blockchain network, thus optimizing performance and scalability of the blockchain-based IIoT data management system.

By further combining a generative model based on Transformer architecture, the present invention enables accurate prediction of future blockchain transaction volume. The application of this technology allows predictive parameter optimization for the blockchain network, enabling optimized parameters to be deployed to the production environment in a timely manner. Therefore, it can effectively deal with transaction latency problem during peak periods of industrial production, and ensure stability and efficiency of the blockchain network under high load conditions.

BRIEF DESCRIPTION OF THE DRAWINGS

In order to illustrate the technical solutions of the embodiments of the present invention or the prior art more clearly, the accompanying drawings required for the description of the embodiments or the prior art will be briefly introduced below.

FIG. 4 is a flow chart of a blockchain-based IIoT data management and optimization method.

FIG. 5 is a prediction flow chart of a Transformer-based generative model.

FIG. 6 is a flow chart of configuring an environment simulating a blockchain in a cloud server.

FIG. 7 is a flow chart of reinforcement learning training and parameter tuning.

DESCRIPTION OF THE EMBODIMENTS

The technical solutions in the embodiments of the present invention will be described clearly and completely below with reference to the accompanying drawings in the embodiments of the present invention.

Figure 1:
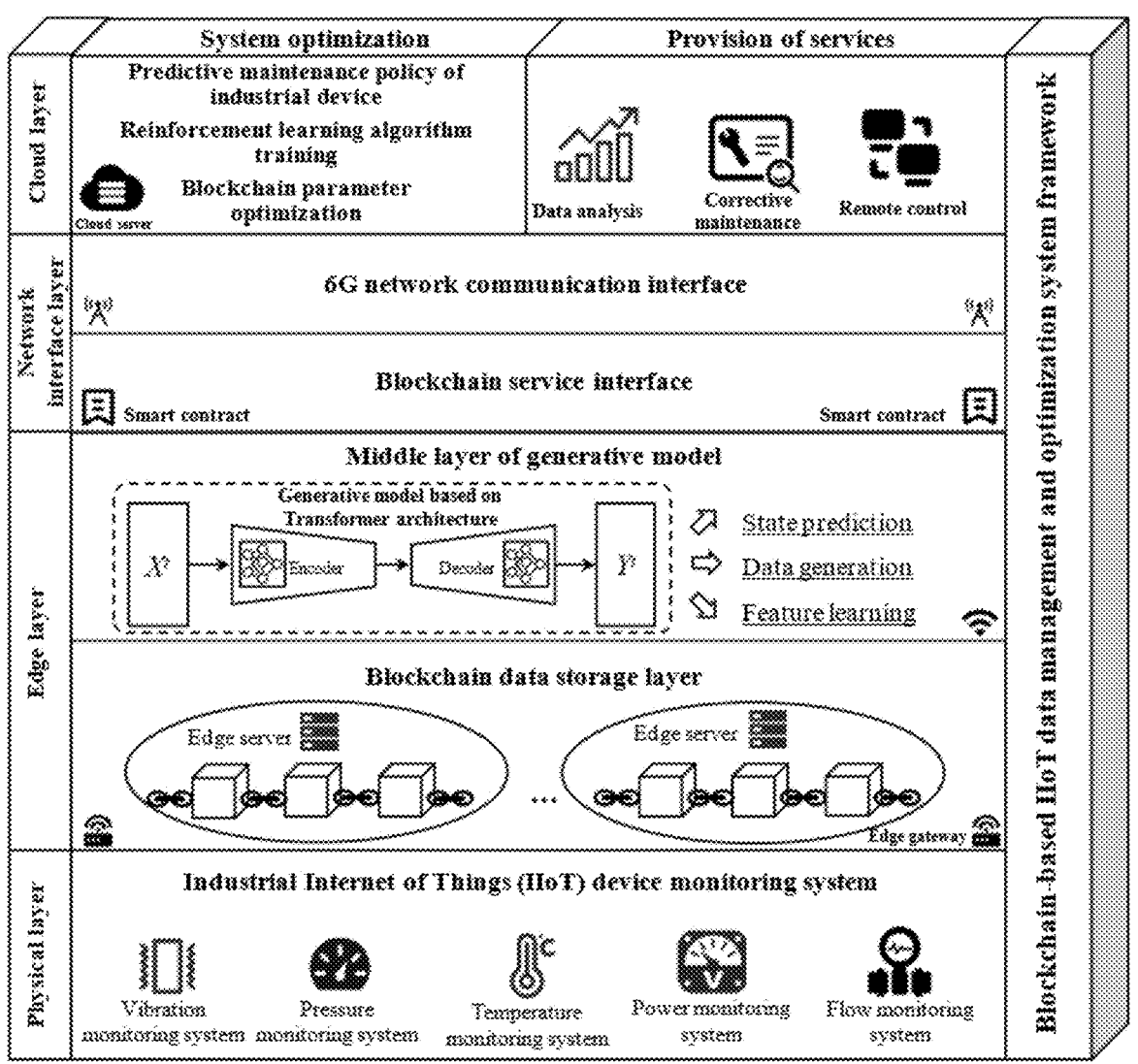
FIG. 1 is a schematic diagram of a blockchain-based IIoT data management and optimization system disclosed in an embodiment of the present invention.

The present invention provides a blockchain-based Industrial Internet of Things (IIoT) data management and optimization system which, as shown in FIG. 1, includes a physical layer, an edge layer, a network interface layer and a cloud layer.

The physical layer includes a plurality of different IIoT device monitoring systems, such as a vibration monitoring system, a pressure monitoring system, a temperature monitoring system, a power monitoring system and a flow monitoring system.

The edge layer includes an edge server and an edge gateway, the edge server and the edge gateway serve as nodes of a blockchain and are configured to build a an IIoT blockchain network; the IIoT blockchain network processes data storage transaction requests of different IIoT device monitoring systems; the edge gateway is responsible for information transmission and data processing tasks between the physical layer and the edge server; the edge server is responsible for collecting performance and parameter data from the IIoT blockchain network, and preprocessing the collected data to ensure accuracy and consistency of the data; and the edge server is also deployed with a Transformer-based generative model which is configured to predict a blockchain transaction volume in a future period of time according to the preprocessed data to obtain a prediction result, and the prediction result will be configured to simulate an environment configuration for the blockchain.

The network interface layer includes a blockchain service interface and a 6G network communication interface, which are responsible for communication connection and blockchain service between the edge layer and the cloud layer, and the blockchain service interface is deployed with a smart contract interface.

The cloud layer includes cloud servers which, in a cloud server cluster, receive the prediction result from the edge server, deploy an environment simulating the blockchain based on the prediction result, and configure a stress test tool for interactive training of an reinforcement learning algorithm, and during the interactive training, the reinforcement learning algorithm selects optimal configuration parameters based on a state of the blockchain network for deployment in a real IIoT blockchain network environment to improve performance and effectiveness of the blockchain network.

Figure 2:
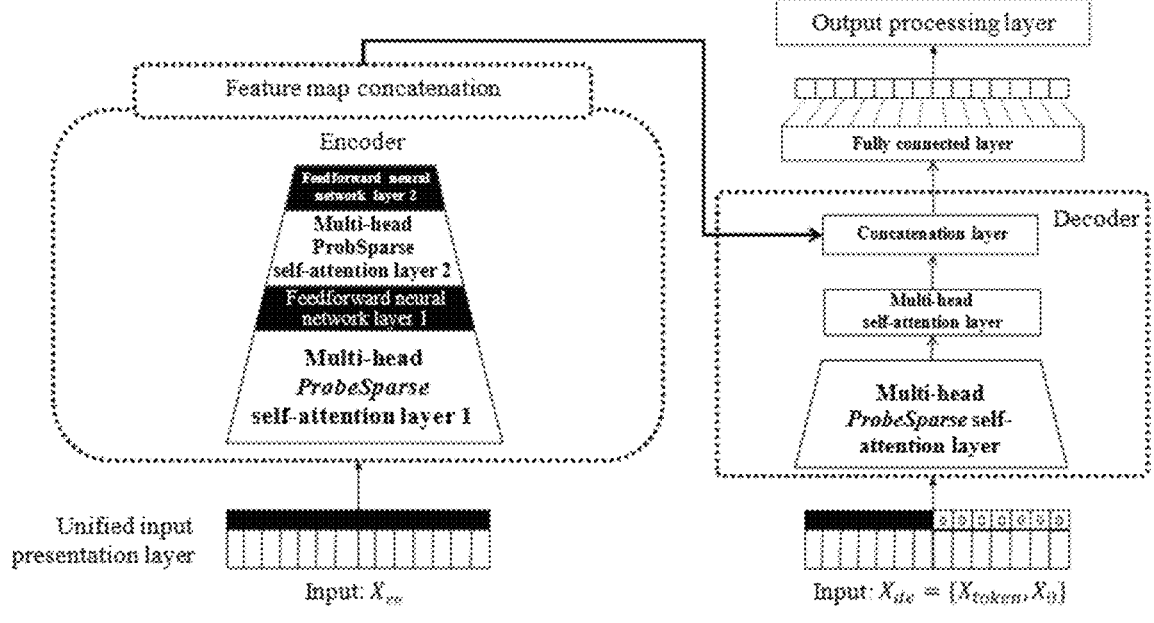
FIG. 2 is a structural diagram of a Transformer-based generative model.

As shown in FIG. 2, the Transformer-based generative model includes a unified input representation layer, an encoder, a decoder, a fully connected layer and an output processing layer; the unified input representation layer is configured to transform the data to generate a representation vector input into the model; the encoder includes two multi-head ProbeSparse self-attention layers, each multi-head ProbeSparse self-attention layer is immediately followed by a feedforward neural network, and the encoder is configured to perform feature extraction processing and output a feature representation of a historical sequence; the decoder includes a masked multi-head ProbeSparse self-attention layer, a multi-head attention layer and a concatenation layer, and the decoder is configured to fuse a feature extraction result output by the encoder and output a prediction sequence vector; the fully connected layer is configured for feature transformation to transform an internal feature of the model into a prediction result useful for an outer world; and the output processing layer is configured to perform inverse normalization processing on a prediction sequence and output the prediction sequence.

A core architecture of the encoder portion consists of two special self-attention layers called ProbeSparse self-attention, which efficiently handle data dependencies over long time spans. This unique attention mechanism reduces computational complexity and improves efficiency in processing large-scale data sequences. Each self-attention layer is immediately followed by a feedforward neural network layer which is responsible for nonlinear transformations between layers. By introducing position encoding, the encoder can maintain sequence information of time series data, ensuring that the model does not ignore temporal dynamics in the series. Combining advanced attention technology and design of deep feedforward network, the encoder portion can not only capture long-term time dependence, but also focus on information segments that have the greatest impact on the future output during prediction, which can be effectively used to predict an arrival rate of IIoT data processing transactions.

The decoder portion also shows a high degree of optimization for long sequence prediction. It is designed through a series of self-attention and masked multi-head attention layers, and each layer is precisely tuned to process and predict future data points. The decoder first processes all generated outputs through the self-attention layer, which helps the model understand and exploit the time dependence of known outputs. The masked multi-head ProbeSparse self-attention layer enables the decoder to efficiently use context information generated by the encoder to highlight historical data points critical to subsequent predictions. In addition, the included feedforward neural network enhances processing capability and optimizes the data flow from input to output. This decoder architecture which combines an autoregressive generation method and a powerful attention mechanism exhibits excellent performance in the long sequence prediction.

Figure 3:
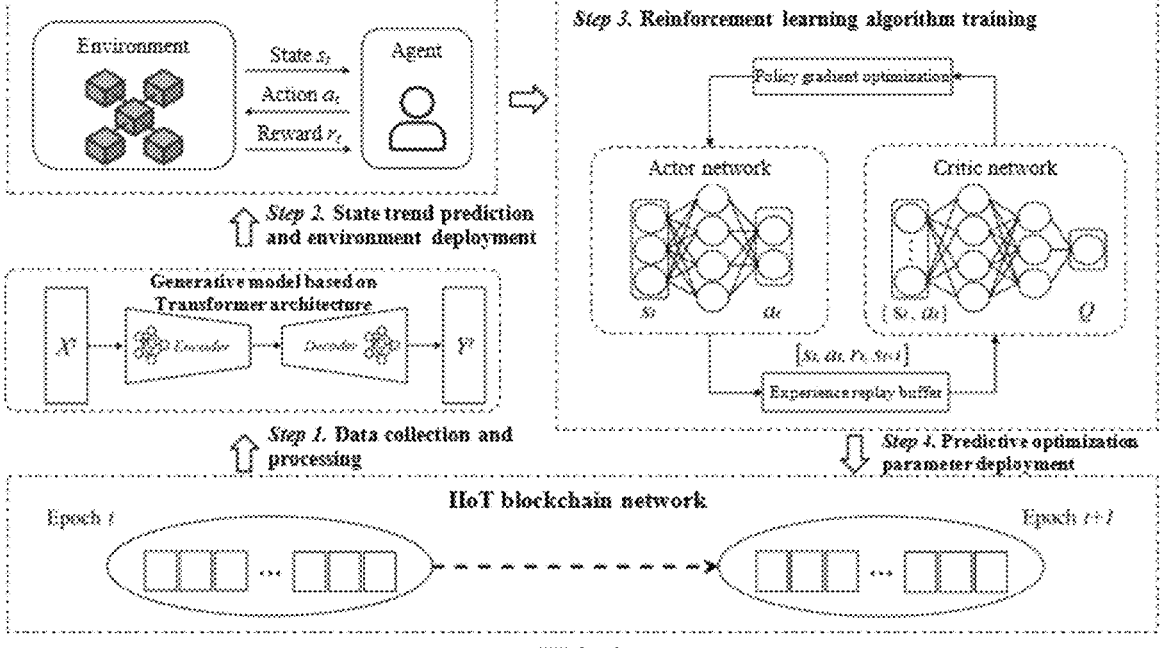
FIG. 3 is a process flow diagram of a blockchain-based IIoT data management and optimization method.

The present invention discloses a blockchain-based IIoT data management and optimization method which, as shown in FIGS. 3 and 4, includes the following steps:

S1, deploying a blockchain running environment in an edge gateway and an edge server, and building an IIoT blockchain network using the edge gateway and the edge server as blockchain nodes.

Specifically, in this architecture, simulating the blockchain environment and reinforcement learning algorithm training are mainly performed on the cloud, while the generative model prediction algorithm is deployed on the edge server. The IIoT blockchain network processes monitoring data generated during operation of different IIoT devices and data storage transaction requests of subsystems, such as a vibration monitoring system, a pressure monitoring system, a temperature monitoring system, a power monitoring system and a flow monitoring system.

S2, collecting, by the edge server, performance and parameter data of the IIoT blockchain network and preprocessing the collected data.

Specifically, in this step, the edge server is responsible for collecting performance and parameter data from the blockchain network. These data include monitoring data generated during operation of different IIoT devices, transaction transmission rates of current state and historical state of a blockchain, and node configuration data. The edge server also needs to preprocess the collected data to ensure accuracy and consistency of the data. Data normalization is used in the present invention so that the model helps to capture and learn subtle fluctuations in time series. Secondly, the time series is divided into multiple sequence blocks, and based on sliding window technology, sequence samples are created, which contain historical data of a specific length (input) and predicted length (output). A normalization formula is as follows:

$$X_{normalized} = \frac{\max(X) - \min(X)}{X - \min(X)}$$

The preprocessed transaction transmission rates of the current state and the historical state of the blockchain will be used as inputs to the generative prediction model.

S3, inputting the preprocessed data into a Transformer-based generative model to predict a blockchain transaction volume in a future period of time.

A specific process is as shown in FIG. 5, and includes the following steps:

Step 1: the preprocessed data passes through a unified input representation layer for data transformation to generate a representation vector input into the model. The unified input representation layer realizes data transformation by combining a global time embedding SE and a local time embedding PE, thus generating a representation vector $$x_{feed}^{t}$$

input into the model:

$$x_{feed[m]}^{t} = \alpha x_m^t + PE_{(N*(t-1)+m)} + \sum_{p}[SE_{(N*(t-1)+m)}]_p$$

Where $\alpha$ is a scalar factor configured to balance importance between feature mapping and time embedding, N is a number of samples, $m \in [1, N]$ represents a sample index, and p and t respectively represent a global time type and a number of input sequences; and the global time embedding is represented by a learnable embedding $SE_{pos}$, while the local time embedding is a fixed position embedding in Transformer, and a calculation formula thereof is:

$$PE_{(pos,2n)} = \sin\left(\frac{pos}{(2N)^{2n/d_{model}}}\right)$$

$$PE_{(pos,2n+1)} = \cos\left(\frac{pos}{(2N)^{2n/d_{model}}}\right)$$

where $n \in [1, \ldots, d_{model}/2]$, pos represents positional information, and $d_{model}$ is a characteristic dimension of the input representation.

Step 2: the representation vector output by the unified input representation layer is put into an encoder for feature extraction processing and a feature representation of a historical sequence is output.

Firstly, the encoder receives $$x_{feed}^{t}$$

from the unified input representation layer and inputs the same into a multi-head ProbeSparse self-attention layer I, and a calculation formula thereof is:

$$ProbeSparse\_Att(Q, K, V) = Softmax\left(\frac{\overline{Q}K^T}{\sqrt{d_{mdel}}}\right)V$$

Where $\overline{Q}$ is a sparse matrix of the same size as Q, and only contains first u most relevant queries under a sparsity metric $M(q_i, K)$; and $Q \in R^{N \times d_{model}}$, $K \in R^{N \times d_{model}}$ and $V \in R^{N \times d_{model}}$ respectively represent a query vector, a key vector and a value vector; these vectors are obtained by performing linear transformation on the input feature, that is, $$[Q, K, V] = [X_{feed}^{t} \cdot W_Q, X_{feed}^{t} \cdot W_K, X_{feed}^{t} \cdot W_V],$$

where $W_Q \in R^{N \times d_{model}}$, $W_K \in R^{N \times d_{model}}$ and $W_V \in R^{N \times d_{model}}$ are trainable parameter matrices respectively corresponding to Q, K and V; and $d_{model}$ is a characteristic dimension of the input representation;

Where a formula of the sparsity metric $M(q_i, K)$ is as follows:

$$M(q_i, K) = \ln \sum_{j=1}^{L_K} e^{\frac{q_i k_j}{\sqrt{d}}} - \frac{1}{L_K} \sum_{j=1}^{L_K} \frac{q_i k_j}{\sqrt{d}}$$

where $q_i$ represents an ith query vector, K represents a key matrix, $k_j$ represents a jth key vector in K, $L_K$ represents a length of the key K which is a number of keys, and d is a characteristic dimension of the input.

After processing by the multi-head ProbeSparse self-attention layer I, a feedforward neural network layer I is used for further operation processing; operation steps of the feedforward neural network are as follows: firstly, a convolutional neural network is used to extract advanced features of the data, and then, a length of the sequence is reduced by max pooling operation, and a specific process is represented as:

$$X_{q+1}^{t} = MaxPool(ELU(Conv1d[X_q^t]_{AB}))$$

where Conv1d represents one-dimensional convolutional operation, ELU is an activation function, and MaxPool is a max pooling function, $$[X_q^t]_{AB}$$

is an output of the multi-head Probesparse self-attention layer I, and $$X_{q+1}^{t}$$

is an output of the multi-head ProbeSparse self-attention layer I; next, after further feature processing by a multi-head Probesparse self-attention layer II and a feedforward neural network layer II with the same structure as above, the features are concatenated and used as an output $$X_{Encoder}^t$$

of the encoder, a formula thereof is expressed as follows:

$$X_{Encoder}^t = Concat\left(FFN2\left(\text{Probesparse\_Att2}\left(X_{q+1}^t\right)\right)\right).$$

Step 3: a decoder fuses a feature extraction result output by the encoder to output a prediction sequence vector.

Firstly, a start marker $$X_{token}^t$$

of the sequence and a placeholder $X_0^t$ of the prediction sequence are input, and these two pieces of data are combined into an input vector of the decoder through a concatenation operation; the start marker indicates the start of the prediction sequence, and the placeholder $X_0^t$ reserves a position for a future prediction value, and a formula thereof is as follows:

$$X_{de}^t = FeatureConcat(X_{token}^t, X_0^t) \in R^{(N_{token}+N_y) \times d_{model}}$$

where $N_{token}$ is a length of the start marker, and $N_y$ is a length of a placeholder of a prediction sequence y; $d_{model}$ is the characteristic dimension of the input representation of the model;

$$X_{de}^t$$

represents an input of the decoder at time t, $$X_{token}^t$$

represents a start marker of a sequence at time t, and $$X_0^t$$

represents a placeholder of a prediction sequence at time t.

The input data $$X_{de}^t$$

first passes through the masked multi-head ProbeSparse self-attention layer to ensure that the model can only access the information before a current time step when generating prediction for each time step, where a formula of the masked multi-head ProbeSparse self-attention layer is expressed as follows:

$$\text{Mask\_ProbeSparse\_Att}(Q, K, V, M) = Softmax\left(\frac{\overline{Q}K^T}{\sqrt{d_{model}}} \Box M\right)V$$

where $\Box$ represents an element multiplication, M is a masked matrix with a shape the same as $\overline{Q}K^T$ and the rest of the letters having the same meanings as those of the multi-head ProbeSparse self-attention layer; and the output of the masked multi-head ProbeSparse attention layer is $X_{mask}$.

Then $X_{mask}$ is put into the multi-head self-attention layer for enhancement processing, and an output result is Attention($X_{mask}$), and a formula of the multi-head self-attention layer is expressed as follows:

$$\text{Attention}(Q, K, V) = Softmax\left(\frac{QK^T}{\sqrt{d_{model}}}\right)V$$

where $Q \in R^{N \times d_{model}}$, $K \in R^{N \times d_{model}}$ and $V \in R^{N \times d_{model}}$ and respectively represent a query vector, a key vector and a value vector; these vectors are obtained by performing linear transformation on the input feature; that is, $$[Q, K, V] = [X_{mask}^t \cdot W_Q, X_{mask}^t \cdot W_K, X_{mask}^t \cdot W_V];$$

where, $W_Q \in R^{N \times d_{model}}$, $W_K \in R^{N \times d_{model}}$ and $W_V \in R^{N \times d_{model}}$ are trainable parameter matrices respectively corresponding to Q, K and V. Then the data Attention($X_{mask}$) output by the multi-head self-attention layer and an output $$X_{Encoder}^t$$

of the encoder are subject to feature concatenation by a concatenation layer to further integrate context information from the encoder, and an output is $X_{Con}$ which is expressed as follows:

$$X_{Con} = Concat(\text{Attention}(X_{mask}), X_{Encoder}^t).$$

Step 4: the prediction sequence vector passes through a fully connected layer for feature transformation to transform an internal feature of the model into a prediction result useful for an outer world.

The concatenated data $X_{Con}$ is subject to feature transformation by the fully connected layer, and the layer outputs a prediction sequence for a future sequence $X_{t+K}$, where K represents a length of the predicted future sequence, a formula thereof is expressed as follows:

$$X_{t+K} = Fc(X_{Con}).$$

Step 5: an output processing layer performs inverse normalization processing on the prediction result and outputs the prediction result.

The prediction sequence $X_{t+K}$ is subject to inverse normalization processing by the output processing layer, and a formula of the inverse normalization processing is:

$$X'_{t+K} = X_{t+K} \cdot (\max(X) - \min(X)) + \min(X)$$

where $$X'_{t+K}$$

represents a prediction of the blockchain transaction volume in the future period of time based on historical and current states, and the prediction result will be configured to simulate an environment configuration for a blockchain, and K represents the length of the predicted future sequence.

S4, deploying a training environment simulating a blockchain in a cloud server according to the predicted blockchain transaction volume in the future period of time.

The prediction generation information is transmitted to the cloud through the network interface layer, and a simulated environment of the blockchain is configured at the cloud according to the predicted future state to enhance learning and training interaction. Specifically, in a cloud server cluster, upon receiving information collected from edge servers, these data will be used to simulate the environment of an actual blockchain network and to configure stress test tools, such as configuring different transmission rates and transaction sizes.

The corresponding process is as shown in FIG. 6. Specifically, the operation of deploying the environment simulating the blockchain includes the following step:

Step 1: environment configuration file modification. Specifically, a network node configuration file and a smart contract storage scale configuration file are modified according to a number of blockchain network nodes and node organization information and channel configuration condition collected in step S2.

Step 2: Configuring and starting a Hyperledger Fabric network; defining an organization and nodes are defined, and then generating a network configuration file and a cryptographic material, such as certificates and keys; and then starting network services including ordering services, node consensus services and chain code installation deployment.

Step 3: using Prometheus to monitor state of the blockchain nodes, and acquiring state information of each current blockchain node.

Specifically, a Prometheus instance is configured and started on the server, and metrics for collecting state information of the blockchain nodes are defined. Next, by running the Exporter program on the blockchain nodes, Prometheus will then periodically obtain the state information from the blockchain nodes and store the same in a time series database. Through a query function of Prometheus, node performance can be observed and analyzed in real time. This continuous monitoring provides critical data for subsequent reinforcement learning algorithms, which are used as state input parameters.

Step 4: starting a stress test tool Caliper and obtaining performance test results of an initial blockchain network.

Specifically, a network configuration file and a test configuration file are first written for performance test, where the network configuration file shall contain a test network name, actor roles, a smart contract name, and channel name settings. The test file contains detailed information of a test environment, a smart contract and a test workload which includes settings for transmission throughput, number and duration of concurrent threads. Among them, the transmission throughput is configured accordingly using the arrival rate of industrial monitoring data predicted in step S3.

Next, Caliper is started to evaluate performance and generate an initial set of performance test results, such as Hyperledger Fabric throughput, average transaction latency, maximum transaction latency, number of transaction successes, number of transaction failures, and resource usage (that is, traffic, average CPU and memory usage of nodes). This provides performance monitoring metrics of the blockchain network for calculation of a reward function in subsequent reinforcement learning algorithms.

S5, configuring algorithm related operation parameters, interacting with the environment simulating the blockchain configured in the cloud server to train a reinforcement learning algorithm, and outputting configuration parameters of the blockchain network at the moment when the reinforcement learning algorithm training process converges or reaches a time prediction window.

Specifically, the reinforcement learning algorithm is a multi-agent deep deterministic policy gradient optimization algorithm applied to optimization of block configuration parameters in the above-mentioned link. It should be noted that the present invention mainly focuses on parameter optimization for the Hyperledger Fabric framework. Among them, Hyperledger Fabric is an enterprise-level permissioned blockchain framework established under the Linux Foundation, and detailed design steps thereof include:

Step 1: proxy type design. In Hyperledger Fabric, peer nodes and ordering nodes are key roles in performing transactions and configuring network parameters. Thus, proxies are designed for the peer nodes and the ordering nodes.

Step 2: state space design. A state space consists of observations from the two types of nodes, represented as $\{O_p, O_o\}$. An observation $O_p = \{P_{et}, P_{vt}, P_{st}, P_c, P_s\}$ of a peer node proxy is defined. Specifically, the observation can be described as endorsement process $P_{et}$ consumption (including chain code execution time in a simulation execution process, an endorsement proposal time), time consumption $P_{vt}$ during verification (including communication latency between peer nodes, ledger verification latency), ledger storage latency $P_{st}$ during submission and peer node computing storage capacities $P_c$ and $P_s$. An observation $O_o = \{O_{bt}, O_{ct}, O_{pt}, O_c, O_s\}$ of an ordering node proxy can be described as node broadcast latency $O_{bt}$, consensus submission latency $O_{ct}$, cluster processing latency $O_{pt}$, node computing performance $O_c$ and storage size $O_s$. In addition, in order to embody characteristics of the blockchain network, three state observations are additionally introduced in the state space: transaction size Ts, number of network nodes $\mathrm{Num}_{peer}$ and $\mathrm{Num}_{order}$.

Step 3: action space design. The configuration parameters of the blockchain nodes are regarded as an action, and a total of 11 parameters are selected. Among them, 5 parameters are configured for the peer nodes (buffer size for accepting blocks, endorsement communication transmission buffer size, gossip transmission interval between nodes and number of propagation nodes), 5 parameters are configured for the ordering nodes (including block size, block transmission interval, number of transactions contained in a block, block division interval and minimum block division transaction volume), and 1 parameter is configured for transaction, that is, transaction queue buffer size.

Step 4: reward function design. It is assumed that default parameter performance of the blockchain network is P, which includes throughput T and latency L. After a tth parameter tuning iteration, the network performance is tuned to $P_r$. To measure performance variations $\Delta P$, a throughput variation $\Delta T$ and a system latency variation $\Delta L$ are defined. The variations are divided into two parts:

1) variations are $\Delta T_{t\to 0}=(T_t-T_0)/T_0$ and $\Delta L_{t\to 0}=(-L_t +L_0)/L_0$ compared with an initial state;

2) variations are $\Delta T_{t\to t-1}=(T_t-T_{t-1})/T_{t-1}$ and $\Delta L_{t\to t-1}=(-L_t +L_{t-1})/L_{t-1}$ compared with a previous moment.

Next, rewards $r_T$ and $r_L$ are calculated according to the throughput and latency performance variations respectively, as shown in the following formula:

$$r_T = \begin{cases} ((1+\Delta T_{t\to 0})^2-1)|1+\Delta T_{t\to t-1}|, & \Delta T_{t\to 0} > 0 \\ -((1-\Delta T_{t\to 0})^2-1)|1-\Delta T_{t\to t-1}|, & \Delta T_{t\to 0} \le 0 \end{cases}$$

$$r_L = \begin{cases} ((1+\Delta L_{t\to 0})^2-1)|1+\Delta L_{t\to t-1}|, & \Delta L_{t\to 0} > 0 \\ -((1-\Delta L_{t\to 0})^2-1)|1-\Delta L_{t\to t-1}|, & \Delta L_{t\to 0} \le 0 \end{cases}$$

The present invention also introduces a hyperparameter $\alpha\in[0,1]$ for controlling a weight between $r_T$ and $r_L$ in a reward r. Furthermore, a penalty term $\lambda^*Tx_{fail}$ for a number of transaction failures is added in the reward function, where $Tx_{fail}$ is the number of transaction failures, and $\lambda$ is a penalty weight. The final reward function r is defined as $\alpha^*r_T+(1-\alpha)^*r_L-\lambda^*Tx_{fail}$. Note that coefficients $\alpha$ and $\lambda$ may be set according to actual usage.

In the algorithm, The peer node agent and the ordering node agent each have two networks: an Actor network $\pi$ and a Critic network Q. In an execution phase, without involving the Critic network, each agent only uses one Actor network $\pi$ to generate the action $\alpha$ and deploy the action to the blockchain, and then stores an overall experience $\{s,\alpha,r,s'\}$ in an experience pool D, where $s=\{O_O,O_P\}$, $\alpha=\{\alpha_O,\alpha_P\}$, and $s'=\{O'_O, O'_P\}$ In a training phase, taking the peer node agent as an example, its Critic network extracts action and observation information of itself and other agents from the experience pool, which are used to train a centralized action value network $Q_P$, and then updates its corresponding Actor network $\pi_P$. MADDPG uses a collective action value function to train the agent to consider the impact of parameters of each node on the performance of Hyperledger Fabric and optimize the blockchain network parameter tuning effect.

During training, the Actor network adjusts its action polices according to the feedback provided by the Critic network, with the goal of improving an expected reward for each action. Meanwhile, Critic optimizes its value estimation according to actual rewards from environmental feedback to guide Actor more accurately. This process is repeated over multiple rounds until the policy converges or a predetermined performance criterion is reached. Through this interactive learning process, the reinforcement learning algorithm can find efficient action policy in complex decision-making environments. The reinforcement learning agent interacts with an environment simulating a blockchain to learn how to select optimal configuration parameters according to the state of the blockchain network, thus improving the performance and effect of the blockchain network.

Specifically, a reinforcement learning training parameter tuning process is as shown in FIG. 7, and includes the following steps:

Step 1: initializing online and target networks of Actor and Critic for agents of two node types, and then initializing a random exploration action process $N_p$, monitoring the deployed Hyperledger Fabric network, receiving the collected initial state s, and performing standardization processing.

Step 2: performing actions according to an agent policy. Specifically, in each iteration, each agent selects an action $\alpha_i$ according to the policy $\pi(\alpha_i)$ and exploration noise N.

Step 3: deploying new blockchain network parameters and restarting the Hyperledger Fabric network according to the agent action.

Step 4: using the stress test tool Caliper to test performance of the Hyperledger Fabric to calculate a reward obtained by a currently performed action. Specifically, the Caliper test results in the throughput, average transaction latency and number of transaction failures of the current blockchain network. The reward is calculated using the following formula:

$$\alpha * r_T + (1-\alpha) * r_L - \lambda * Tx_{fail}$$

In the formula, the hyperparameter $\alpha\in[0,1]$ is a reward balance factor, $r_T$ is a throughput reward, $r_L$ is a latency reward, $Tx_{fail}$ is the number of transaction failures, and $\lambda$ is a penalty weight. After a reward value is calculated, an average value is assigned to each agent.

Step 5: monitoring the Prometheus and collecting a new blockchain network state s'.

Step 6: storing an experience tuple. Specifically, the current state s, the executed action $\alpha$, the reward r and a new state s' are stored as a tuple (s, $\alpha$, r, s'), and placed in an experience replay buffer D.

Step 7: extracting, by the Critic network, actions and observation information of itself and other agents from the experience pool to train a centralized action value network $Q_P$.

Step 8: updating parameters $\theta$ of the Actor network based on a gradient ascent method, and then softly updating parameters of their target networks, that is, after every certain number of iteration steps, the parameters of the online network are directly assigned to the target network.

Step 9: in the training phase, when throughput of five consecutive feedbacks changes by less than 5 tps, or the training time has reached a previously preset time window, output action parameters at this time are recorded and used as optimization parameters for predictive tuning.

S6, in a real IIoT blockchain network environment, deploying parameters optimized in the environment simulating the blockchain to the real environment in case of traffic fluctuation of the blockchain; or abandoning parameter tuning in case of no traffic fluctuation, and repeating steps S2 to S5 to continue a next stage of predictive optimization.

After training, optimization parameters recommended by the reinforcement learning algorithm can be used in a next stage of blockchain adjustment, thus achieving predictive parameter optimization and avoiding lag caused by the training process. When the IIoT transaction changes due to human factors, such as increased data processing due to production changes, timely deployment of the optimization parameters can be achieved.

The previous description of the disclosed embodiments is provided to enable any person skilled in the art to make or use the present invention. Various modifications to these embodiments will be readily apparent to those skilled in the art, and the generic principles defined herein may be implemented in other embodiments without departing from the spirit or scope of the present invention. Thus, the present invention is not intended to be limited to the embodiments shown herein but is to be accorded the widest scope consistent with the principles and novel features disclosed herein.

What is claimed is:

1. A blockchain-based Industrial Internet of Things (IIoT) data management and optimization system, comprising a physical layer, an edge layer, a network interface layer and a cloud layer; wherein the physical layer comprises a plurality of different IIoT device monitoring systems;

the edge layer comprises an edge server and an edge gateway, the edge server and the edge gateway serve as nodes of a blockchain and are configured to build a an IIoT blockchain network; the IIoT blockchain network processes data storage transaction requests of different IIoT device monitoring systems; the edge gateway is responsible for information transmission and data processing tasks between the physical layer and the edge server; the edge server is responsible for collecting performance and parameter data from the IIoT blockchain network, and preprocessing the collected data to ensure accuracy and consistency of the data; and the edge server is also deployed with a Transformer-based generative model which is configured to predict a blockchain transaction volume in a future period of time according to the preprocessed data to obtain a prediction result, and the prediction result will be configured to simulate an environment configuration for the blockchain;

the network interface layer comprises a blockchain service interface and a 6G network communication interface, which are responsible for communication connection and blockchain service between the edge layer and the cloud layer, and the blockchain service interface is deployed with a smart contract interface; and the cloud layer comprises cloud servers which, in a cloud server cluster, receive the prediction result from the edge server, deploy an environment simulating the blockchain based on the prediction result, and configure a stress test tool for interactive training of an reinforcement learning algorithm, and during the interactive training, the reinforcement learning algorithm selects optimal configuration parameters based on a state of the blockchain network for deployment in a real IIoT blockchain network environment to improve performance and effectiveness of the blockchain network.

2. The blockchain-based IIoT data management and optimization system according to claim 1, wherein the Transformer-based generative model comprises a unified input representation layer, an encoder, a decoder, a fully connected layer and an output processing layer; the unified input representation layer is configured to transform the data to generate a representation vector input into the model; the encoder comprises two multi-head ProbeSparse self-attention layers, each multi-head ProbeSparse self-attention layer is immediately followed by a feedforward neural network, and the encoder is configured to perform feature extraction processing and output a feature representation of a historical sequence; the decoder comprises a masked multi-head ProbeSparse self-attention layer, a multi-head attention layer and a concatenation layer, and the decoder is configured to fuse a feature extraction result output by the encoder and output a prediction sequence vector; the fully connected layer is configured for feature transformation to transform an internal feature of the model into a prediction result useful for an outer world; and the output processing layer is configured to perform inverse normalization processing on a prediction sequence vector and output the prediction sequence.

3. A blockchain-based IIoT data management and optimization method, using the blockchain-based IIoT data management and optimization system according to claim 1, comprising the following steps:

S1, deploying a blockchain running environment in an edge gateway and an edge server, and building an IIoT blockchain network using the edge gateway and the edge server as blockchain nodes;

S2, collecting, by the edge server, performance and parameter data of the IIoT blockchain network and preprocessing the collected data;

S3, inputting the preprocessed data into a Transformer-based generative model to predict a blockchain transaction volume in a future period of time;

S4, deploying a training environment simulating a blockchain in a cloud server according to the predicted blockchain transaction volume in the future period of time;

S5, configuring algorithm related operation parameters, interacting with the environment simulating the blockchain configured in the cloud server to train a reinforcement learning algorithm, and outputting configuration parameters of the blockchain network at the moment when the reinforcement learning algorithm training process converges or reaches a time prediction window; and S6, in a real IIoT blockchain network environment, deploying parameters optimized in the environment simulating the blockchain to the real environment in case of traffic fluctuation of the blockchain; or abandoning parameter tuning in case of no traffic fluctuation, and repeating steps S2 to S5 to continue a next stage of predictive optimization.

4. The blockchain-based IIoT data management and optimization method according to claim 3, wherein a specific method of step S3 is as follows:

Step 1: the preprocessed data passes through a unified input representation layer for data transformation to generate a representation vector input into the model;

Step 2: the representation vector output by the unified input representation layer is put into an encoder for feature extraction processing and a feature representation of a historical sequence is output;

Step 3: a decoder fuses a feature extraction result output by the encoder to output a prediction sequence vector;

Step 4: the prediction sequence vector passes through a fully connected layer for feature transformation to transform an internal feature of the model into a prediction result useful for an outer world; and Step 5: an output processing layer performs inverse normalization processing on the prediction result and outputs the prediction result.

5. The blockchain-based IIoT data management and optimization method according to claim 4, wherein a specific processing process of Step 1 is as follows:

the unified input representation layer realizes data transformation by combining a global time embedding SE and a local time embedding PE, thus generating a representation vector $$x^t_{feed}$$

input into the model:

$$x_{feed[m]}^t = \alpha x_m^t + PE_{(N*(t-1)+m)} + \sum_p [SE_{(N*(t-1)+m)}]_p$$

where $\alpha$ is a scalar factor configured to balance importance between feature mapping and time embedding, N is a number of samples, $m \in [1, N]$ represents a sample index, and p and t respectively represent a global time type and a number of input sequences; and the global time embedding is represented by a learnable embedding $SE_{pos}$, while the local time embedding is a fixed position embedding in Transformer, and a calculation formula thereof is:

$$PE_{(pos,2n)} = \sin\left(\frac{pos}{(2N)^{2n/d_{model}}}\right)$$

$$PE_{(pos,2n+1)} = \cos\left(\frac{pos}{(2N)^{2n/d_{model}}}\right)$$

where $n \in [1, \ldots, d_{model}/2]$, pos represents positional information, and $d_{model}$ is a characteristic dimension of the input representation.

6. The blockchain-based IIoT data management and optimization method according to claim 4, wherein a specific processing process of Step 2 is as follows:

firstly, the encoder receives $$x_{feed}^t$$

from the unified input representation layer and inputs the same into a multi-head ProbeSparse self-attention layer I, and a calculation formula thereof is:

$$ProbeSparse\_Att(Q, K, V) = Softmax\left(\frac{\overline{Q}K^T}{\sqrt{d_{model}}}\right)V$$

where $\overline{Q}$ is a sparse matrix of the same size as Q, and only contains first u most relevant queries under a sparsity metric $M(q_i, K)$; and $Q \in R^{N \times d_{model}}$, $K \in R^{N \times d_{model}}$ and $V \in R^{N \times d_{model}}$ respectively represent a query vector, a key vector and a value vector; these vectors are obtained by performing linear transformation on the input feature, that is, $$[Q, K, V] = [X_{feed}^t \cdot W_Q, X_{feed}^t \cdot W_K, X_{feed}^t \cdot W_V],$$

where $W_Q \in R^{N \times d_{model}}$, $W_K \in R^{N \times d_{model}}$ and $W_V \in R^{N \times d_{model}}$ are trainable parameter matrices respectively corresponding to Q, K and V; and $d_{model}$ is a characteristic dimension of the input representation;

where a formula of the sparsity metric $M(q_i, K)$ is as follows:

$$M(q_i, K) = \ln \sum_{j=1}^{L_K} e^{\frac{q_i k_j}{\sqrt{d}}} - \frac{1}{L_K} \sum_{j=1}^{L_K} \frac{q_i k_j}{\sqrt{d}}$$

where $q_i$ represents an ith query vector, K represents a key matrix, $k_j$ represents a jth key vector in K, $L_K$ represents a length of the key K which is a number of keys, and d is a characteristic dimension of the input;

after processing by the multi-head ProbeSparse self-attention layer I, a feedforward neural network layer I is used for further operation processing; operation steps of the feedforward neural network are as follows: firstly, a convolutional neural network is used to extract advanced features of the data, and then a length of the sequence is reduced by max pooling operation, and a specific process is represented as:

$$X_{q+1}^t = MaxPool(ELU(Conv1d[X_q^t]_{AB}))$$

where Conv1d represents one-dimensional convolutional operation, ELU is an activation function, and MaxPool is a max pooling function, $$[X_q^t]_{AB}$$

is an output of the multi-head Probesparse self-attention layer I, and $$X_{q+1}^t$$

is an output of the multi-head ProbeSparse self-attention layer I; next, after further feature processing by a multi-head Probesparse self-attention layer II and a feedforward neural network layer II with the same structure as above, the features are concatenated and used as an output $$X_{Encoder}^t$$

of the encoder, a formula thereof is expressed as follows:

$$X_{Encoder}^t = Concat(FFN2(Probesparse\_Att2(X_{q+1}^t))).$$

7. The blockchain-based IIoT data management and optimization method according to claim 4, wherein a specific processing process of Step 3 is as follows:

firstly, a start marker $X_{token}^t$ of the sequence and a placeholder $X_0^t$ of the prediction sequence are input, and these two pieces of data are combined into an input vector of the decoder through a concatenation operation; the start marker indicates the start of the prediction sequence, and the placeholder $X_0^t$, reserves a position for a future prediction value, and a formula thereof is as follows:

$$X_{de}^t = FeatureConcat(X_{token}^t, X_0^t) \in R^{(N_{token}+N_y) \times d_{model}}$$

where $N_{token}$ is a length of the start marker, and $N_y$ is a length of a placeholder of a prediction sequence y; $d_{model}$ is the characteristic dimension of the input representation of the model;

$$X_{de}^t$$

represents an input of the decoder at time t, $$X_{token}^t$$

represents a start marker of a sequence at time t, and $$X_0^t$$

represents a placeholder of a prediction sequence at time t; the input data $$X_{de}^t$$

first passes through the masked multi-head ProbeSparse self-attention layer to ensure that the model can only access the information before a current time step when generating prediction for each time step, where a formula of the masked multi-head ProbeSparse self-attention layer is expressed as follows:

$$\text{Mask\_ProbeSparse\_Att}(Q, K, V, M) = \text{Softmax}\left(\frac{\overline{Q}K^T}{\sqrt{d_{model}}} \square\, M\right)V$$

where $\square$ represents an element multiplication, M is a masked matrix with a shape the same as $\overline{Q}K^T$ and the rest of the letters having the same meanings as those of the multi-head ProbeSparse self-attention layer; and the output of the masked multi-head ProbeSparse attention layer is $X_{mask}$;

then $X_{mask}$ is put into the multi-head self-attention layer for enhancement processing, and an output result is Attention($X_{mask}$), and a formula of the multi-head self-attention layer is expressed as follows:

$$\text{Attention}(Q, K, V) = \text{Softmax}\left(\frac{QK^T}{\sqrt{d_{model}}}\right)V$$

where $Q \in R^{N \times d_{model}}$, $K \in R^{N \times d_{model}}$ and $V \in R^{N \times d_{model}}$ respectively represent a query vector, a key vector and a value vector; these vectors are obtained by performing linear transformation on the input feature; that is, $$[Q, K, V] = [X_{mask}^t \cdot W_Q, X_{mask}^t \cdot W_K, X_{mask}^t \cdot W_V];$$

where $W_Q \in R^{N \times d_{model}}$, $W_K \in R^{N \times d_{model}}$ and $W_V \in R^{N \times d_{model}}$ are trainable parameter matrices respectively corresponding to Q, K and V;

then the data Attention($X_{mask}$) output by the multi-head self-attention layer and an output $$X_{Encoder}^t$$

of the encoder are subject to feature concatenation by a concatenation layer to further integrate context information from the encoder, and an output is $X_{Con}$ which is expressed as follows:

$$X_{Con} = \text{Concat}(\text{Attention}(X_{mask}), X_{Encoder}^t).$$

8. The blockchain-based IIoT data management and optimization method according to claim 4, wherein in Step 4, the concatenated data $X_{Con}$ is subject to feature transformation by the fully connected layer, and the layer outputs a prediction sequence for a future sequence $X_{t+K}$, where K represents a length of the predicted future sequence, a formula thereof is expressed as follows:

$$X_{t+K} = Fc(X_{Con})$$

in Step 5, the prediction sequence $X_{t+K}$ is subject to inverse normalization processing by the output processing layer, and a formula of the inverse normalization processing is:

$$X_{t+K}' = X_{t+K} \cdot (\max(X) - \min(X)) + \min(X)$$

where $$X_{t+K}'$$

represents a prediction of the blockchain transaction volume in the future period of time based on historical and current states, and the prediction result will be configured to simulate an environment configuration for a blockchain, and K represents the length of the predicted future sequence.

9. The blockchain-based IIoT data management and optimization method according to claim 3, wherein in step S4, the operation of deploying the environment simulating the blockchain comprises the following steps:

Step 1: environment configuration file modification: modifying a network node configuration file and a smart contract storage scale configuration file according to a number of blockchain network nodes and node organization information and channel configuration condition collected in step S2;

Step 2: configuring and starting a Hyperledger Fabric network, defining an organization and nodes, then generating a network configuration file and an encryption material, and then starting network services comprising ordering services, node consensus services and chain code installation deployment;

Step 3: using Prometheus to monitor state of the blockchain nodes, and acquiring state information of each current blockchain node; and Step 4: starting a stress test tool Caliper and obtaining performance test results of an initial blockchain network.

10. The blockchain-based IIoT data management and optimization method according to claim 3, wherein in step S5, the reinforcement learning algorithm training parameter tuning process comprises the following steps:

Step 1: initializing online and target networks of Actor and Critic for agents of two node types, and then initializing a random exploration action process $N_p$, monitoring the deployed Hyperledger Fabric network, receiving the collected initial state s and performing standardization processing;

Step 2: performing actions according to an agent policy: in each iteration, each agent selects an action $\alpha_i$ according to the policy $\pi(\alpha_i)$ and exploration noise N;

Step 3: deploying new blockchain network parameters and restarting the Hyperledger Fabric network according to the agent action;

Step 4: using the stress test tool Caliper to test performance of the Hyperledger Fabric to calculate a reward obtained by a currently performed action; and after the reward value is obtained by calculating, taking an average value to allocate to each agent;

Step 5: monitoring the Prometheus and collecting a new blockchain network state s';

Step 6: storing an experience tuple: storing the current state s, the executed action $\alpha$, the reward r and a new state s' as a tuple (s, $\alpha$, r, s'), and placing the tuple in an experience replay buffer D;

Step 7: extracting, by the Critic network, actions and observation information of itself and other agents from the experience replay buffer D to train a centralized action value network $Q_p$;

Step 8: updating a parameter of the Actor network based on a gradient ascent method, and then softly updating parameters of their target networks, that is, after every certain number of iteration steps, the parameters of the online network are directly assigned to the target network; and Step 9: in the training phase, when throughput of five consecutive feedbacks changes by less than 5 tps, or the training time has reached a previously preset time window, output action parameters at this time are recorded and used as optimization parameters for predictive tuning.

* * * * *